J. R. FLANNERY AND E. I. DODDS.
STAY BOLT STRUCTURE.
APPLICATION FILED JAN. 27, 1921.
1,403,760.
Patented Jan. 17, 1922.
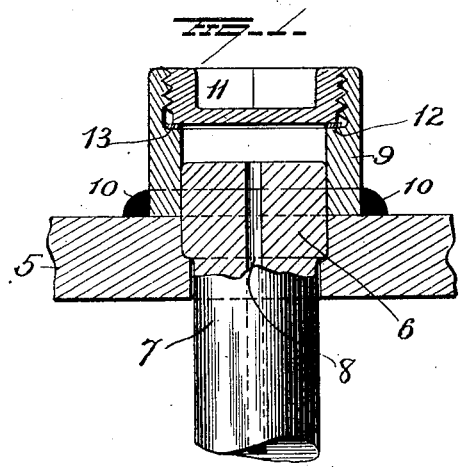
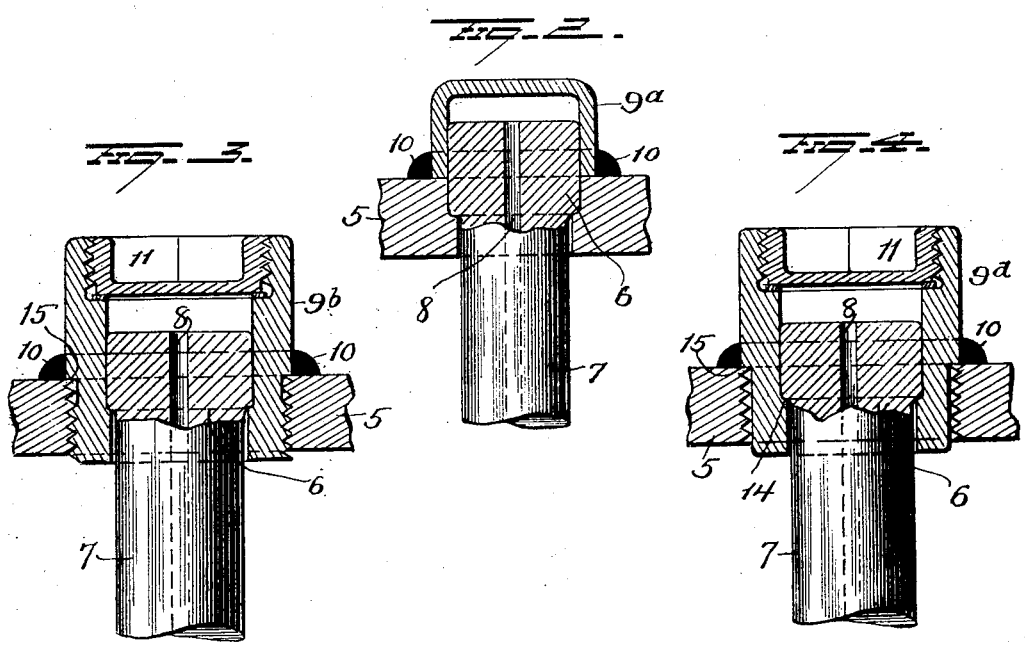
Inventors
J. R. Flannery and
E. I. Dodds
By Seymour & Bright
Attorneys

UNITED STATES PATENT OFFICE.

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAY-BOLT STRUCTURE.

1,403,760.  Specification of Letters Patent.  Patented Jan. 17, 1922.

Application filed January 27, 1921. Serial No. 440,424.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful improvements in Stay-Bolt Structures; and we do hereby declare the following to be a full, clear, and exact description of the invention, such as will enable others skilled in the art to which it appertains to make and use the same.

This invention relates to an improvement in staybolt structures, the object being to provide a bolt that will be free to move longitudinally, but be held against lateral deflection and it consists in a staybolt having a cylindrical head, and a fixed sleeve conforming in size and shape to the diameter of said head, the sleeve being secured to the outer sheet of the boiler.

In the accompanying drawings; Figure 1 is a view in section of one embodiment of our invention, and Figures 2, 3 and 4 are views of modifications of the same.

5 represents the outer sheet of a boiler having a stay bolt opening counterbored adjacent the outer face of the sheet to form a seat for the head 6 of the bolt 7. This head, which is cylindrical, fits snugly in the counterbore of the sheet 5, so that while it may have a free longitudinal movement, it is held against lateral or angular deflection or movement. The bolt is preferably provided with a tell-tale 8 extending longitudinally through the same, and when in place its head preferably projects, as shown beyond the plane of the outer surface of the sheet.

9 is a cylindrical sleeve the bore of which conforms to the diameter and shape of the head to receive the latter and assist in supporting the head. The sleeve shown in Figure 1, is seated on the outer face of the sheet and is welded thereto as at 10 and is counterbored at its outer end, the counterbored portion being internally threaded to receive the peripherally threaded cap 11 which, when seated, rests on a gasket 12 carried by the shoulder 13 formed by counterboring the sleeve, and form a steam tight joint. The cap is normally removed from the outer flat surface of the head of the bolt sufficiently to permit of the necessary longitudinal movement of the bolt, but close enough to form a stop for the head and thus limit the collapsing movement of the inner and outer sheet, the bolt 7 being secured to the inner sheet (not shown) in the usual and well known manner.

In the construction shown in Figure 2 the sleeve 9ª is permanently closed at its outer end, and is secured to the sheet 5 by welding as in Figure 1.

In the construction shown in Figure 3, the sleeve 9ᵇ is screwed into a threaded opening in the sheet 5 and is permanently secured by welding as at 10 and in Figure 4 a plain unthreaded sleeve 9ᶜ is inserted in a threaded opening and secured by welding. This latter form is designed particularly for repair work by inserting a sleeve in a threaded opening from which a threaded sleeve has been removed.

In the construction shown in Figures 3 and 4 the seat for the bolt head instead of being formed in the sheet 5, is formed in the sleeve as at 14, and the latter is provided with a peripheral shoulder 15 to engage the outer surface of the sheet 5 to limit the inward movement of the sleeve and take all the pulling stresses.

In Figures 1 and 2 the boiler sheet 5 takes all the pulling stresses, the weld 10 simply taking care of any collapsing strains and also securing the sleeve to the sheet 5.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent, is:—

1. In a staybolt structure, the combination of a boiler sheet having a bolt opening, a stay bolt having a cylindrical head, and a sleeve the internal diameter of which is approximately the same as the external diameter and shape as the head and forming a guiding support for the latter the said sleeve being welded to the boiler sheet.

2. In a stay bolt structure, the combination of a boiler sheet having a bolt opening, a stay bolt having a cylindrical head, a sleeve the internal diameter of which is of approximately the same diameter and shape as the external diameter of the head, the said sleeve being welded to the boiler sheet and a removable closure for the outer end of the head.

3. In a staybolt structure, the combination of a boiler sheet having a stay bolt opening and a seat for the bolt head, a bolt having a cylindrical head, and a sleeve welded to the boiler sheet and embracing the upper part of the head, the internal diameter of the sleeve being approximately the diameter and shape of the head.

4. In a staybolt structure, the combination of a boiler sheet having a staybolt opening and a seat for the bolt head, a bolt having a cylindrical head, a sleeve welded to the boiler sheet and embracing the upper part of the head, the internal diameter of the sleeve being approximately the same as the external diameter and shape of the said head and a detachable closure for the sleeve.

In testimony whereof, we have signed this specification in the presence of a subscribing witness.

JOHN ROGERS FLANNERY.
ETHAN I. DODDS.

Witness:
EDWIN S. RYCE.